US012789422B2

(12) United States Patent
McGuire et al.

(10) Patent No.: US 12,789,422 B2
(45) Date of Patent: Nov. 10, 2026

(54) SYSTEM AND METHOD FOR FORMING A PANEL FOR AN INTERNAL CABIN OF A VEHICLE

(71) Applicant: THE BOEING COMPANY, Arlington, VA (US)

(72) Inventors: Christopher David McGuire, Granite, WA (US); Phillip Edward Pacini, Bothell, WA (US); Jason Turner, Marysville, WA (US); Michael John Cloud, Seattle, WA (US)

(73) Assignee: The Boeing Company, Arlington, VA (US)

( * ) Notice: Subject to any disclaimer, the term of this patent is extended or adjusted under 35 U.S.C. 154(b) by 142 days.

(21) Appl. No.: 18/755,782

(22) Filed: Jun. 27, 2024

(65) Prior Publication Data

US 2026/0001258 A1 Jan. 1, 2026

(51) Int. Cl.

| | |
|---|---|
| ***B29C 43/36*** | (2006.01) |
| ***B29C 43/04*** | (2006.01) |
| ***B29C 43/52*** | (2006.01) |
| ***B29L 7/00*** | (2006.01) |
| ***B29L 31/30*** | (2006.01) |
| ***B64C 1/06*** | (2006.01) |

(52) U.S. Cl.

CPC .............. *B29C 43/36* (2013.01); *B29C 43/04* (2013.01); *B29C 43/52* (2013.01); *B64C 1/066* (2013.01); *B29K 2869/00* (2013.01); *B29K 2905/00* (2013.01); *B29K 2995/0015* (2013.01); *B29L 2007/002* (2013.01); *B29L 2031/3076* (2013.01)

(58) Field of Classification Search

None

See application file for complete search history.

(56) References Cited

U.S. PATENT DOCUMENTS

| | | | | |
|---|---|---|---|---|
| 2004/0096535 | A1* | 5/2004 | Hudecek | B29C 33/306 249/102 |
| 2015/0217551 | A1 | 8/2015 | Laker | |
| 2018/0162039 | A1* | 6/2018 | Cloud | B29C 51/105 |
| 2019/0366599 | A1* | 12/2019 | LeBlanc | B29C 43/52 |
| 2020/0122215 | A1 | 4/2020 | Sanders | |

FOREIGN PATENT DOCUMENTS

| | | |
|---|---|---|
| CA | 2103882 | 2/1995 |
| CA | 2103882 A1 * | 2/1995 |

OTHER PUBLICATIONS

Partial European Search Report for EP App. No. 25185502.9-1015, dated Nov. 27, 2025.

* cited by examiner

*Primary Examiner* — Virak Nguon

(74) *Attorney, Agent, or Firm* — Joseph M. Butscher; Carroll, Hoette & Butscher, LLC

(57) ABSTRACT

A system and a method include one or more mounting plates formed of one or more metals. One or more forming plates are formed of the one or more metals. The one or more forming plates include one or more heating elements. One or more bases are secured between the one or more mounting plates and the one or more forming plates. The one or more bases are formed of a temperature-resistant plastic. The one or more forming plates are configured to form a panel through compression and heating.

20 Claims, 4 Drawing Sheets

SYSTEM AND METHOD FOR FORMING A PANEL FOR AN INTERNAL CABIN OF A VEHICLE

FIELD OF THE DISCLOSURE

Examples of the present disclosure generally relate to systems and methods for forming a panel of an internal cabin of a vehicle.

BACKGROUND OF THE DISCLOSURE

Aircraft are used to transport passengers and cargo between various locations. Numerous aircraft depart from and arrive at a typical airport every day.

An internal cabin of an aircraft includes a floor, sidewalls, and a ceiling. Various portions of such structures include panels that define surfaces.

Match dies are typically used to form panels for aircraft interiors. A known match die includes upper and lower forming plates that form the panel. Upper and lower metal bases are secured to the upper and lower forming plates, respectively. Further, upper and lower metal mounting plates secure to the upper and lower bases. During operation, steam is used to heat the forming plates. The metal bases draw heat from the forming plates, resulting in significant heat transfer from the forming plates.

In general, each of the forming plates, the bases, and the mounting plates are machined from steel or aluminum. Because the panels are relatively large, the components of the match dies are large, bulky, and heavy. In particular, the metal components of the match dies increase overall weight and cost. Such heavy tools typically require complex tool storage and transportation equipment.

SUMMARY OF THE DISCLOSURE

A need exists for an efficient and effective system and method for forming panels, such as can be used within internal cabins of vehicles. Further, a need exists for a lighter and less expensive tool for manufacturing such panels.

With those needs in mind, certain examples of the present disclosure provide a system including one or more mounting plates formed of one or more metals. One or more forming plates are formed of the one or more metals. The one or more forming plates include one or more heating elements. One or more bases are secured between the one or more mounting plates and the one or more forming plates. The one or more bases are formed of a temperature-resistant plastic. The one or more forming plates are configured to form a panel through compression and heating.

In at least one example, one or more presses are secured to the one or more mounting plates.

In at least one example, the one or more mounting plates include a first mounting plate and a second mounting plate. The one or more forming plates include a first forming plate and a second forming plate. The one or more bases include a first base secured between the first mounting plate and the first forming plate, and a second base secured between the second mounting plate and the second forming plate. A first die includes the first mounting plate, the first base, and the first forming plate. A second die includes the second mounting plate, the second base, and the second forming plate. The first forming plate and the second forming plate are configured to compress and heat the panel therebetween.

In at least one example, one of the first base or the second base includes guide pins. The other of the first base or the second base includes reciprocal channels. The guide pins are configured to be received by the reciprocal channels as the first die moves relative toward the second die.

As an example, the temperature-resistant plastic includes polycarbonate.

In at least one example, the one or more bases are formed through additive manufacturing. As an example, a three-dimensional (3D) printer is used to form the one or more bases.

In at least one example, the one or more bases comprise one or more retaining channels. The one or more forming plates are secured within the one or more retaining channels.

In at least one example, the one or more bases include one or more standoff pads.

In at least one example, the one or more bases includes parallel passages configured to receive lifting arms of a fork lift.

Certain examples of the present disclosure provide a method including: forming one or more mounting plates from of one or more metals; forming one or more forming plates from the one or more metals; providing the one or more forming plates with one or more heating elements; forming one or more bases from a temperature-resistant plastic; and securing the one or more bases secured between the one or more mounting plates and the one or more forming plates. The one or more forming plates are configured to form a panel through compression and heating.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
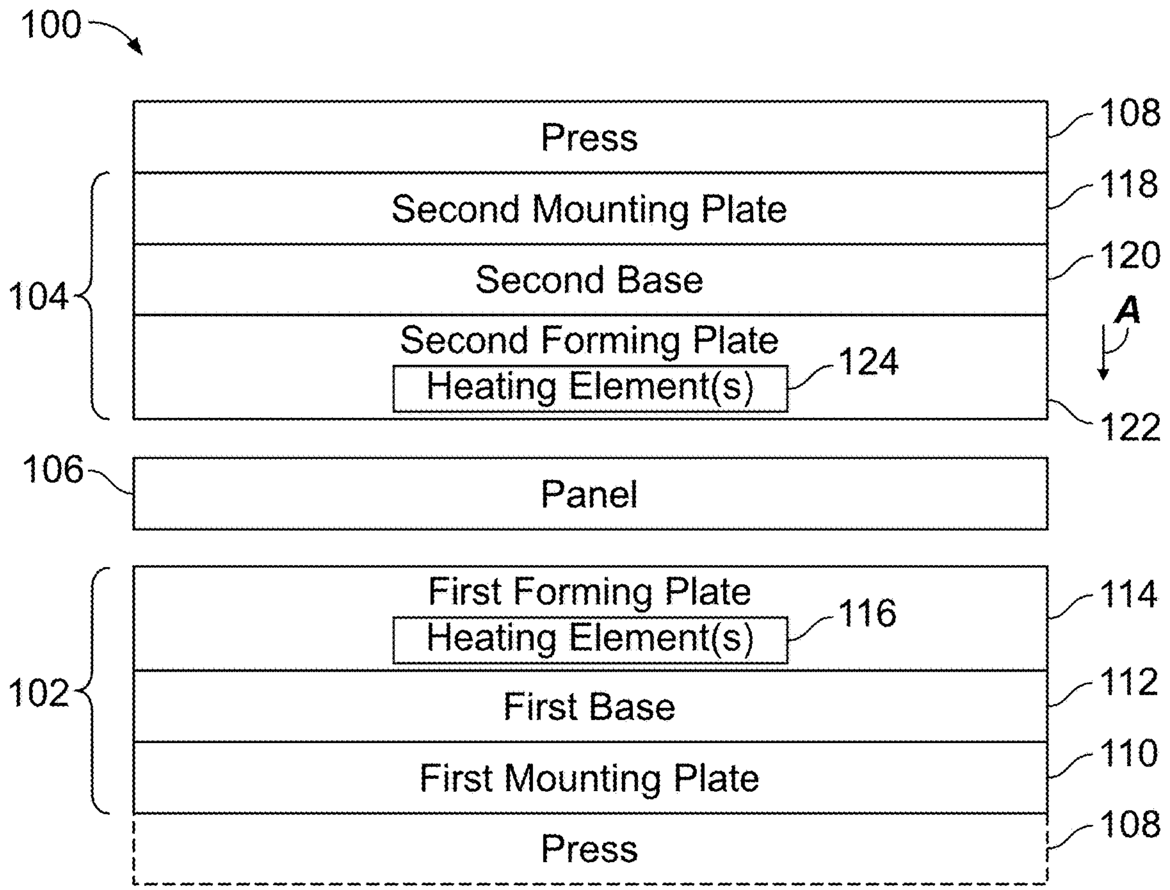
FIG. 1 illustrates a block diagram of a system, according to an example of the present disclosure.

FIG. 1 illustrates a block diagram of a system 100, according to an example of the present disclosure. The system 100 includes a first die 102 (such as a lower or bottom die) and a second die 104 (such as an upper or top die). The first die 102 and the second die 104 are configured to form a panel 106 therebetween. As an example, the first die 102 and the second die 104 are configured as match dies to form panels for vehicles, such as aircraft.

In at least one example, the panel 106 can be formed of a plastic. As another example, the panel 106 can be formed of a composite material, which can include a honeycomb core sandwiched between outer plastic skins. The panel 106 can be used within an internal cabin of a vehicle, such as a commercial aircraft. For example, the panel 106 can be used to provide a portion of a surface of a wall, floor, ceiling, or the like within the internal cabin. Optionally, the panel 106 can be used in various other structures, components, devices, or the like.

A press 108 is secured to the second die 104. The press 108 can be a mechanical press that is configured to move the second die 104 toward the first die 102 in the direction of arrow A to compress the panel 106 therebetween. In at least one example, the press 108 can be manually operated, such as through a hand wheel. As another example, the press 108 can be automatically operated, such as through one or more motors.

Optionally, the press 108 can be secured to the first mounting plate 110, and configured to move the first die 102 upwardly toward the second die 104 in a direction opposite from arrow A. Also optionally, a first press can be operatively coupled to the first die 102 and a second press can be operatively coupled to the second die 104.

The first die 102 includes a first mounting plate 110, such as a lower or bottom mounting plate. The first mounting plate 110 is formed of a metal, such as steel or aluminum. A first base 112, such as a lower or bottom base, is secured to the first mounting plate 110, such as through one or more fasteners, adhesives, and/or the like. The first base 112 is formed of a different material than the first mounting plate 110. In at least one example, the first base 112 is formed of a material that is able to withstand the temperatures and pressures of a panel forming process. For example, the first base 112 can be formed of a temperature resistant resin. In at least one example, the first base 112 is formed of a plastic. For example, the first base 112 can be formed of a resin. In at least one example, the first base 112 is formed of polycarbonate.

A first forming plate 114, such as a lower or bottom forming plate, is secured to the first base 112, such as through one or more fasteners, adhesives, and/or the like. The first base 112 is secured between the first mounting plate 110 and the first forming plate 114.

The first forming plate 114 is formed of a different material than the first base 112. For example, the first forming plate 114 is formed of a metal, such as steel or aluminum. The first forming plate 114 includes one or more heating elements 116. The heating element(s) 116 can be embedded within and/or mounted onto a surface of the first forming plate 114. For example, the heating element(s) 116 can be internal pipes that form a fluid circuit on or within the first forming plate 114. The fluid circuit is configured to allow a heating fluid, such as steam or heated liquid, to pass therethrough and provide heat to the first forming plate 114. As another example, the heating element(s) 116 can be electric heating elements.

The second die 104 includes a second mounting plate 118, such as an upper or top mounting plate. The second mounting plate 118 is formed of a metal, such as steel or aluminum. The second mounting plate 118 is clamped to the press 108, such as through one or more magnetic couplings, mechanical clamps, and/or the like. A second base 120, such as an upper or top base, is secured to the second mounting plate 118, such as through one or more fasteners, adhesives, and/or the like. The second base 120 is formed of a different material than the second mounting plate 118. In at least one example, the second base 120 is formed of a material that is able to withstand the temperatures and pressures of a panel forming process. For example, the second base 120 can be formed of a temperature resistant resin. In at least one example, the second base 120 is formed of a plastic. For example, the second base 120 can be formed of a resin. In at least one example, the second base 120 is formed of polycarbonate.

A second forming plate 122, such as an upper or top forming plate, is secured to the second base 120, such as through one or more fasteners, adhesives, and/or the like. The second base 120 is secured between the second mounting plate 118 and the second forming plate 122. The second forming plate 122 is formed of a different material than the second base 120. For example, the second forming plate 122 is formed of a metal, such as steel or aluminum. The second forming plate 122 includes one or more heating elements 124. The heating element(s) 124 can be embedded within and/or mounted onto a surface of the second forming plate 122. For example, the heating element(s) 124 can be internal pipes that form a fluid circuit on or within the second forming plate 122. The fluid circuit is configured to allow a heating fluid, such as steam or heated liquid, to pass therethrough and provide heat to the second forming plate 122. As another example, the heating element(s) 124 can be electric heating elements.

Figure 2:
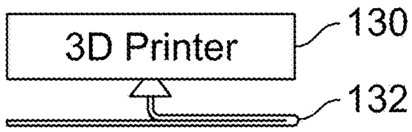
FIG. 2 illustrates a simplified block diagram of a three-dimensional printer, according to an example of the present disclosure.

FIG. 2 illustrates a simplified block diagram of a three-dimensional (3D) printer 130, according to an example of the present disclosure. Referring to FIGS. 1 and 2, in at least one example, the first base 112 and the second base 120 are formed through additive manufacturing. For example, the 3D printer 130 is operated to deposit layers 132 of material to form the first base 112 and the second base 120. Additional layers 132 are deposited over lower layers 132 until the first base 112 and the second base 120 are fully formed. Because the first base 112 and the second base 120 can be relatively large, the process of forming the first base 112 and the second base 120 is efficiently and effectively performed, as there is no need for a large and expensive mold for formation. Instead, the first base 112 and the second base 120 are additively manufactured through 3D printing. Alternatively, the first base 112 and the second base 120 can be formed using a mold, such as via injection molded thermoplastic.

As noted, the first base 112 and the second base 120 are formed of a plastic, such as a resin, a polycarbonate, or the like. In contrast to previous match dies, the first base 112 and the second base 120 are not formed of metal. The plastic of the first base 112 and the second base 120 provides a lighter, less costly tool system, which is used to form the panel 106.

In operation, the press 108 is operated to move the second die 104 toward the first die 102 in the direction of arrow A. As the panel 106 is compressively sandwiched between the first die 102 and the second die 104, the heating elements 116 and 124 are operated to heat the first forming plate 114 and the second forming plate 122, respectively, to impart heat into the compressed panel 106, which further forms the panel 106 (such as by curing internal and/or external portions). Because the first base 112 and the second base 120 are formed of plastic (and not metal), the entireties of the first die 102 and the second die 104 are not heated. Instead, only the first forming plate 114 and the second forming plate 122 are heated, thereby conserving energy, and reducing the time to form the panel 106. Because the first base 112 and the second base 120 are formed of a plastic such as polycarbonate (instead of metal), the first base 112 and the second base 120 minimize or otherwise reduce heat transfer from the first forming plate 114 and the second forming plate 122 to the first mounting plate 110 and the second mounting plate 118, respectively.

Forming the first base 112 and the second base 120 as plastics, such as via 3D printing, reduces overall weight and cost of the system 100. Further, additively manufacturing the first base 112 and the second base through 3D printing allows flexibility to incorporate features which may not be readily attainable using standard metal machining. In general, forming the first base 112 and the second base 120 by 3D printing reduces energy consumption, and reduces heat up times of the first forming plate 114 and the second forming plate 122. Further, the first forming plate 114 and the second forming plate 122 can have substantially less mass (as compared to the large metal dies of previously known forming tools).

As described herein, the system 100 includes one or more bases, such as the first base 112 and the second base 120, which can be additively manufactured by the 3D printer 130. The first base 112 and the second base 120 are formed of a temperature resistant plastic, such as a temperature-resistant resin. The first base 112 and the second base 120 are configured to withstand heat and act as isolators to block heat transfer between other components, and reduce energy consumption of the system 100.

As described herein, the system 100 includes one or more mounting plates (such as the first mounting plate 110 and the second mounting plate 118) formed of one or more metals (for example, steel or aluminum). One or more forming plates (such as the first forming plate 114 and the second forming plate 122) are also formed of the one or more metals. The one or more forming plates include one or more heating elements (such as the heating elements 116 and 124). One or more bases (such as the first base 112 and the second base 120) are secured between the one or more mounting plates and the one or more forming plates. The one or more bases are formed of a temperature-resistant plastic. The or more forming plates are configured to form the panel 106 through compression and heating. In at least one example, one or more presses 108 are secured to the one or more mounting plates.

Figure 3:
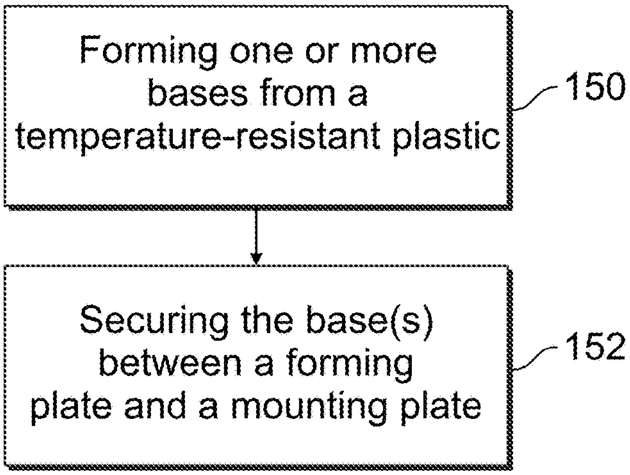
FIG. 3 illustrates a flow chart of a method, according to an example of the present disclosure.

FIG. 3 illustrates a flow chart of a method, according to an example of the present disclosure. Referring to FIGS. 1-3, at 150, one or more bases (such as the first base 112 and the second base 120) are formed from a temperature-resistant plastic, such as polycarbonate. In at least one example, the forming 150 includes additive manufacturing via 3D printing. At 152, each base is secured between a forming plate (such as the first forming plate 114 or the second forming plate 122) and a mounting plate (such as the first mounting plate 110 or the second mounting plate 118). The forming plate(s) and the mounting plate(s) are formed from a different material than the bases. For example, the forming plate(s) and the mounting plate(s) are formed of a metal, such as steel or aluminum. In at least one example, a method includes forming one or more mounting plates from of one or more metals; forming one or more forming plates from the one or more metals; providing the one or more forming plates with one or more heating elements; forming one or more bases from a temperature-resistant plastic; and securing the one or more bases secured between the one or more mounting plates and the one or more forming plates.

Figure 4:
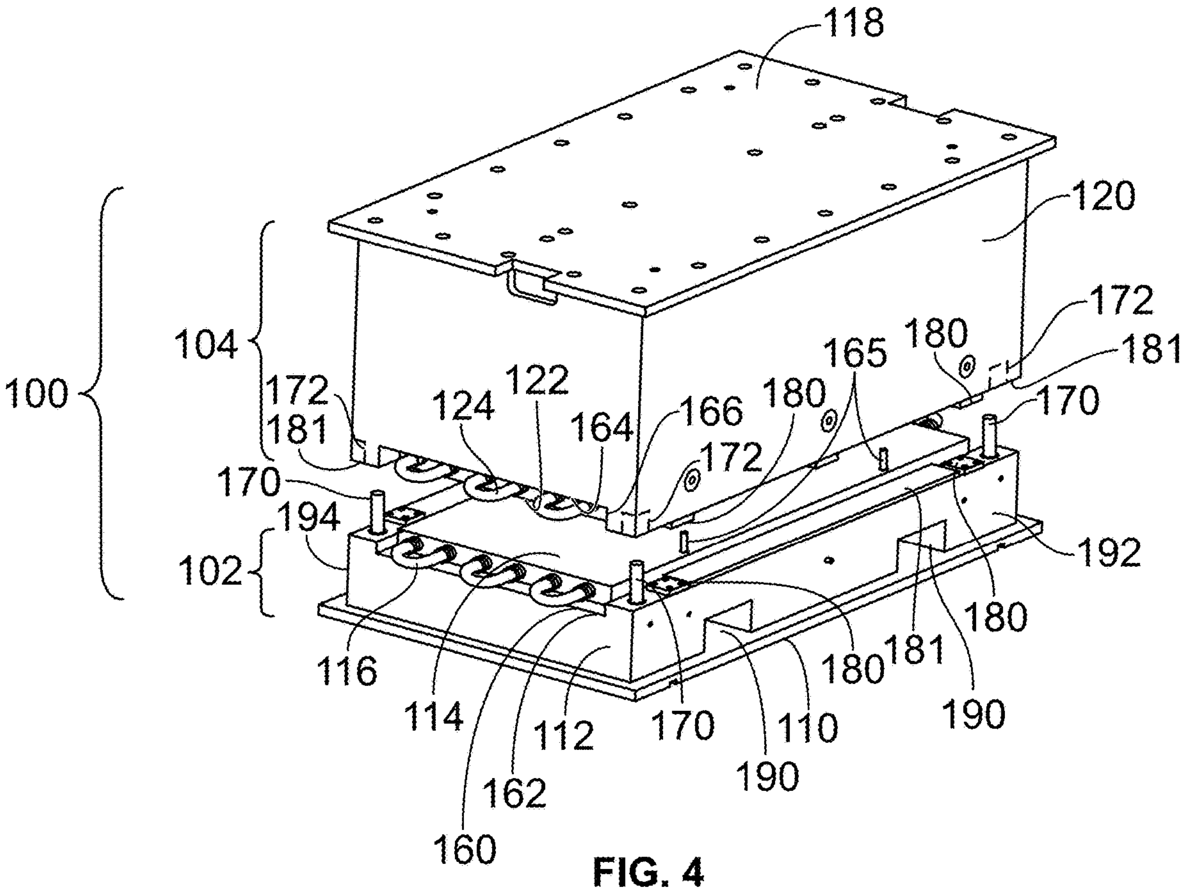
FIG. 4 illustrates an isometric view of a system, according to an example of the present disclosure.
Figure 5:
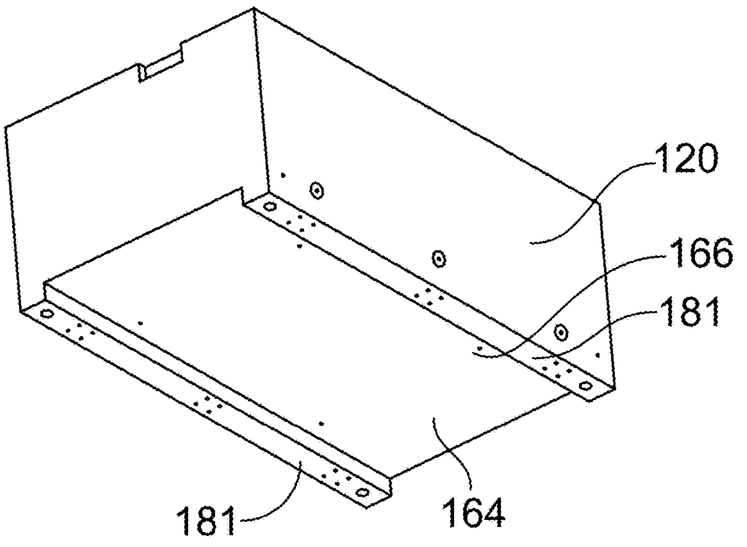
FIG. 5 illustrates a bottom isometric view of a base, according to an example of the present disclosure.

FIG. 4 illustrates an isometric view of the system 100, according to an example of the present disclosure. FIG. 5 illustrates a bottom isometric view of the base 120, according to an example of the present disclosure. Referring to FIGS. 4 and 5, A retaining channel 160 is formed in an upper surface 162 of the first base 112. The retaining channel 160 is configured to receive and retain the first forming plate 114, which can be secured within the retaining channel 160 by one or fasteners, adhesives, and/or the like. For example, fasteners 165 (such as screws, bolts, or the like) are used to secure the first forming plate 114 to the first base 112. Similarly, a retaining channel 164 is formed in a lower surface 166 of the second base 120. The retaining channel 160 is configured to receive and retain the second forming plate 122, which can be secured within the retaining channel 160 by fasteners, adhesives, and/or the like.

Guide pins 170 can upwardly extend from one or more portions of the upper surface 162 of the first base 112. The guide pins 170 can be outside of the retaining channel 160. As an example, a guide pin 170 can upwardly extend from each corner of the first base 112. The guide pins 170 are configured to be received by reciprocal channels 172 formed in the lower surface 166 of the second base 120. As the first die 102 is moved toward the second die 104, the guide pins 170 move into the reciprocal channels 172 to ensure proper alignment of the first die 102 in relation to the second die 104. Alternatively, the system 100 may not include the guide pins 170 and the channels 172.

One more standoff pads 180 are secured on surfaces of the first base 112 and/or the second base 120. As shown, the standoff pads 180 are disposed on exterior ledges 181 outside of the retaining channels. The standoff pads 180 are sized and shaped to ensure that the first forming plate 114 does not contact the second forming plate 122 when the first die 102 and the second die 104 are fully pressed together. That is, the standoff pads 180 provide separating structures that prevent the first forming plate 114 from contacting the second forming plate 122. In so doing, the standoff pads 180 ensure that first forming plate 114 and the second forming plate 122 do not undesirably contact one another. Alternatively, the system 100 may not include the standoff pads.

As shown, the first base 110 can include parallel passages 190 extending between and through opposite sides 192 and 194. The passages 190 are configured to receive lifting arms of a fork lift, for example, which can be used to lift and move the system 100. Optionally, the first base 110 may not include the passages 190.

Figure 6:
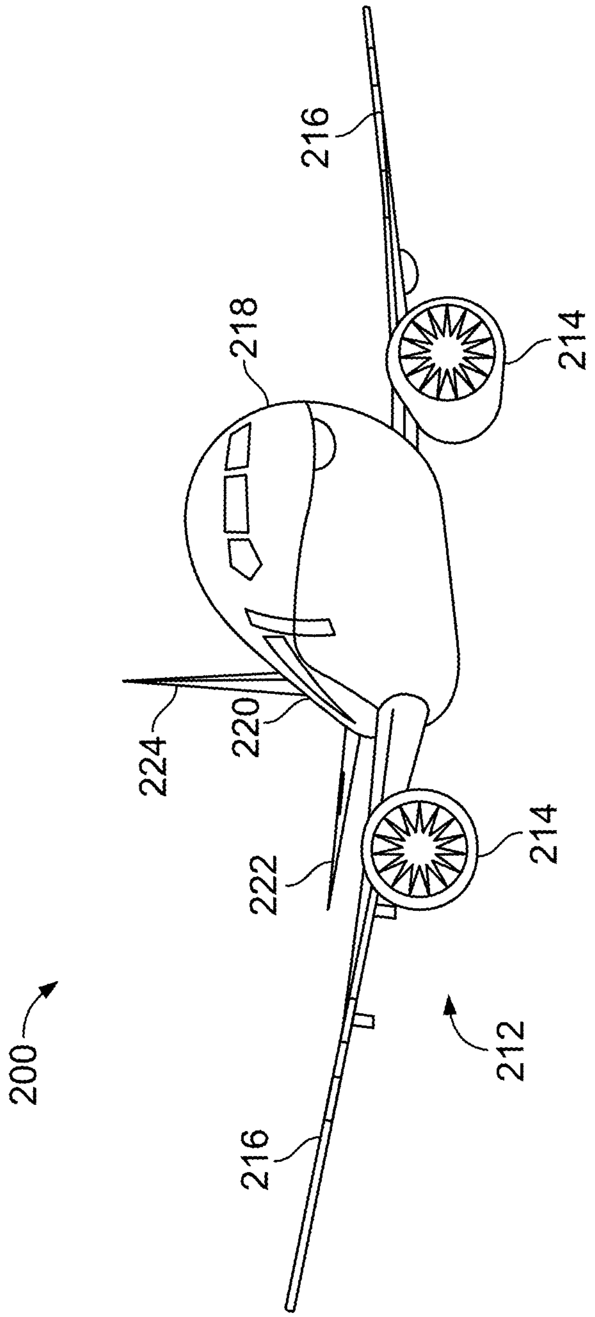
FIG. 6 illustrates a perspective front view of an aircraft.

FIG. 6 illustrates a perspective front view of an aircraft 200, which may include panels formed by the systems and methods described herein. The aircraft 200 includes a propulsion system 212 that includes engines 214, for example. Optionally, the propulsion system 212 may include more engines 214 than shown. The engines 214 are carried by wings 216 of the aircraft 200. In other examples, the engines 214 may be carried by a fuselage 218 and/or an empennage 220. The empennage 220 may also support horizontal stabilizers 222 and a vertical stabilizer 224.

The fuselage 218 of the aircraft 200 defines an internal cabin, which includes a flight deck or cockpit, one or more work sections (for example, galleys, personnel carry-on baggage areas, and the like), one or more passenger sections (for example, first class, business class, and coach sections), one or more lavatories, and/or the like. The internal cabin includes panels as formed by the systems and methods described herein.

Alternatively, instead of an aircraft, examples of the present disclosure can be used with various other types of vehicles. Suitable vehicles may include automobiles, buses, trucks, locomotives and train cars, watercraft, spacecraft, and the like. Also, alternatively, examples of the present disclosure can be used to form panels used to manufacture structures, components, devices, and/or the like, whether or not within vehicles.

Figure 7:
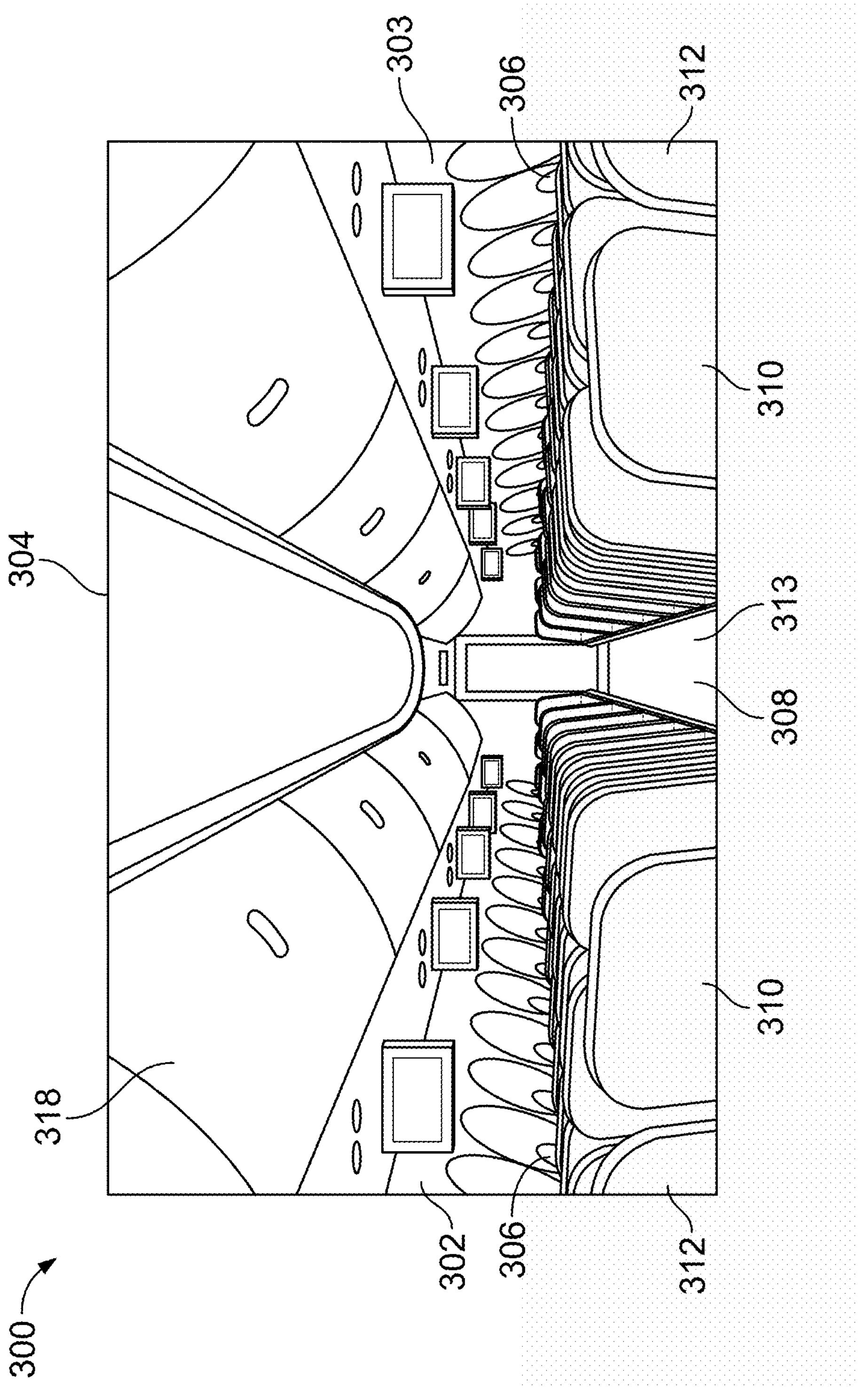
FIG. 7 illustrates a perspective interior view of an internal cabin of an aircraft.

FIG. 7 illustrates a perspective interior view of an internal cabin 300 of an aircraft. The internal cabin 300 may be within the aircraft 200 shown in FIG. 6. The internal cabin 300 includes a floor assembly 308 that extends from a first side 302 of the internal cabin 300 to a second side 303 of the internal cabin 300. The first and second sides 302, 303 are defined at least in part by sidewalls that connect to a ceiling 304. The internal cabin 300 includes windows 306 along the first and second sides 302, 303. The floor assembly 308 supports rows 312 of seats 310. In the illustrated example, each row 312 includes groups of three seats 310 on either side of a single aisle 313. The rows 312 are spaced apart along a longitudinal length of the internal cabin 300. In alternative configurations, at least some rows may include groups of more or less than three seats and/or at least two aisles. One or more portions of the internal cabin 300, such as the floor assembly 308, the sides 302 and 303, and/or the ceiling 304 include panels formed by the systems and methods described herein.

Further, the disclosure comprises examples according to the following clauses:

Clause 1. A system comprising:

one or more mounting plates formed of one or more metals;

one or more forming plates formed of the one or more metals, wherein the one or more forming plates include one or more heating elements; and one or more bases secured between the one or more mounting plates and the one or more forming plates, wherein the one or more bases are formed of a temperature-resistant plastic, wherein the one or more forming plates are configured to form a panel through compression and heating.

Clause 2. The system of Clause 1, further comprising one or more presses secured to the one or more mounting plates.

Clause 3. The system of Clauses 1 or 2, wherein the one or more mounting plates comprise a first mounting plate and a second mounting plate, wherein the one or more forming plates comprise a first forming plate and a second forming plate, wherein the one or more bases comprises a first base secured between the first mounting plate and the first forming plate, and a second base secured between the second mounting plate and the second forming plate, wherein a first die comprises the first mounting plate, the first base, and the first forming plate, wherein a second die comprises the second mounting plate, the second base, and the second forming plate, and wherein the first forming plate and the second forming plate are configured to compress and heat the panel therebetween.

Clause 4. The system of Clause 3, wherein one of the first base or the second base comprises guide pins, wherein the other of the first base or the second base comprises reciprocal channels, wherein the guide pins are configured to be received by the reciprocal channels as the first die moves relative toward the second die.

Clause 5. The system of any of Clauses 1-4, wherein the temperature-resistant plastic includes polycarbonate.

Clause 6. The system of any of Clauses 1-5, wherein the one or more bases are formed through additive manufacturing.

Clause 7. The system of any of Clauses 1-6, wherein a three-dimensional (3D) printer is used to form the one or more bases.

Clause 8. The system of any of Clauses 1-7, wherein the one or more bases comprise one or more retaining channels, wherein the one or more forming plates are secured within the one or more retaining channels.

Clause 9. The system of any of Clauses 1-8, wherein the one or more bases comprise one or more standoff pads.

Clause 10. The system of any of Clauses 1-9, wherein the one or more bases comprise parallel passages configured to receive lifting arms of a fork lift.

Clause 11. A method comprising:

forming one or more mounting plates from of one or more metals;

forming one or more forming plates from the one or more metals;

providing the one or more forming plates with one or more heating elements;

forming one or more bases from a temperature-resistant plastic; and securing the one or more bases secured between the one or more mounting plates and the one or more forming plates, wherein the one or more forming plates are configured to form a panel through compression and heating.

Clause 12. The method of Clause 11, further comprising securing one or more presses to the one or more mounting plates.

Clause 13. The method of Clauses 11 or 12, wherein the one or more mounting plates comprise a first mounting plate and a second mounting plate, wherein the one or more forming plates comprise a first forming plate and a second forming plate, wherein the one or more bases comprises a first base secured between the first mounting plate and the first forming plate, and a second base secured between the second mounting plate and the second forming plate, wherein a first die comprises the first mounting plate, the first base, and the first forming plate, wherein a second die comprises the second mounting plate, the second base, and the second forming plate, and wherein the first forming plate and the second forming plate are configured to compress and heat the panel therebetween.

Clause 14. The method of Clause 13, wherein one of the first base or the second base comprises guide pins, wherein the other of the first base or the second base comprises reciprocal channels, wherein the guide pins are configured to be received by the reciprocal channels as the first die moves relative toward the second die.

Clause 15. The method of any of Clauses 11-14, wherein the temperature-resistant plastic includes polycarbonate.

Clause 16. The method of any of Clauses 11-15, wherein said forming the one or more bases comprises additively manufacturing the one or more bases.

Clause 17. The method of any of Clauses 11-16, wherein said forming the one or more bases comprises using a three-dimensional (3D) printer to form the one or more bases.

Clause 18. The method of any of Clauses 11-17, wherein the one or more bases comprise one or more retaining channels, wherein the one or more forming plates are secured within the one or more retaining channels, and wherein the one or more bases comprise one or more standoff pads.

Clause 19. A system comprising:

a first die including:

a first mounting plate formed of one or more metals;

a first forming plate formed of the one or more metals, wherein the first forming plate includes one or more first heating elements; and a first base secured between the first mounting plate and the first forming plate, wherein first base is formed of a temperature-resistant plastic, and wherein a three-dimensional (3D) printer is used to form the first base; and a second die including:

a second mounting plate formed of the one or more metals;

a second forming plate formed of the one or more metals, wherein the second forming plate includes one or more second heating elements; and a second base secured between the second mounting plate and the second forming plate, wherein second base is formed of the temperature-resistant plastic, and wherein the 3D printer is used to form the second base, wherein the first forming plate and the second forming plate are configured to form a panel through compression and heating.

Clause 20. The system of Clause 19, further comprising one or more presses secured to the one or both of the first mounting plate or the second mounting plate, wherein one of the first base or the second base comprises guide pins, wherein the other of the first base or the second base comprises reciprocal channels, wherein the guide pins are configured to be received by the reciprocal channels as the first die moves relative toward the second die, and wherein the first base and the second base further comprise standoff pads.

As described herein, examples of the present disclosure provide efficient and effective systems and methods for forming panels, such as can be used within internal cabins of vehicles. Further, examples of the present disclosure provide lighter and less expensive tools for manufacturing such panels.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

one or more mounting plates formed of one or more metals;

one or more forming plates formed of the one or more metals, wherein the one or more forming plates include one or more heating elements; and one or more bases secured between the one or more mounting plates and the one or more forming plates, wherein the one or more bases are formed of a temperature-resistant plastic, wherein the one or more bases include one or more retaining channels that directly receive and retain the one or more forming plates, wherein the one or more forming plates are configured to form a panel through compression and heating.

2. The system of claim 1, further comprising one or more presses secured to the one or more mounting plates.

3. The system of claim 1, wherein the one or more mounting plates comprise a first mounting plate and a second mounting plate, wherein the one or more forming plates comprise a first forming plate and a second forming plate, wherein the one or more bases comprises a first base secured between the first mounting plate and the first forming plate, and a second base secured between the second mounting plate and the second forming plate, wherein a first die comprises the first mounting plate, the first base, and the first forming plate, wherein a second die comprises the second mounting plate, the second base, and the second forming plate, and wherein the first forming plate and the second forming plate are configured to compress and heat the panel therebetween.

4. The system of claim 3, wherein one of the first base or the second base comprises guide pins outside of the one or more retaining channels, wherein the other of the first base or the second base comprises reciprocal channels, wherein the guide pins are configured to be received by the reciprocal channels as the first die moves relative toward the second die.

5. The system of claim 1, wherein the temperature-resistant plastic includes polycarbonate.

6. The system of claim 1, wherein the one or more bases are formed through additive manufacturing.

7. The system of claim 1, wherein a three-dimensional (3D) printer is used to form the one or more bases.

8. The system of claim 1, wherein the one or more bases comprise one or more standoff pads disposed on exterior ledges outside of the one or more retaining channels.

9. The system of claim 1, wherein the one or more bases comprise parallel passages configured to receive lifting arms of a fork lift.

10. The system of claim 1, wherein the one or more forming plates are directly secured to the one or more bases within the one or more retaining channels by one or both of fasteners or adhesives.

11. A method comprising:

forming one or more mounting plates from of one or more metals;

forming one or more forming plates from the one or more metals;

providing the one or more forming plates with one or more heating elements;

forming one or more bases from a temperature-resistant plastic; and securing the one or more bases between the one or more mounting plates and the one or more forming plates, wherein said securing comprises directly receiving and retaining the one or more forming plates within one or more retaining channels of the one or more bases, wherein the one or more forming plates are configured to form a panel through compression and heating.

12. The method of claim 11, further comprising securing one or more presses to the one or more mounting plates.

13. The method of claim 11, wherein the one or more mounting plates comprise a first mounting plate and a second mounting plate, wherein the one or more forming plates comprise a first forming plate and a second forming plate, wherein the one or more bases comprises a first base secured between the first mounting plate and the first forming plate, and a second base secured between the second mounting plate and the second forming plate, wherein a first die comprises the first mounting plate, the first base, and the first forming plate, wherein a second die comprises the second mounting plate, the second base, and the second forming plate, and wherein the first forming plate and the second forming plate are configured to compress and heat the panel therebetween.

14. The method of claim 13, wherein one of the first base or the second base comprises guide pins outside of the one or more retaining channels, wherein the other of the first base or the second base comprises reciprocal channels, wherein the guide pins are configured to be received by the reciprocal channels as the first die moves relative toward the second die.

15. The method of claim 11, wherein the temperature-resistant plastic includes polycarbonate.

16. The method of claim 11, wherein said forming the one or more bases comprises additively manufacturing the one or more bases.

17. The method of claim 11, wherein said forming the one or more bases comprises using a three-dimensional (3D) printer to form the one or more bases.

18. The method of claim 11, wherein the one or more bases comprise one or more standoff pads disposed on exterior ledges outside of the one or more retaining channels.

19. A system comprising:

a first die including:

a first mounting plate formed of one or more metals;

a first forming plate formed of the one or more metals, wherein the first forming plate includes one or more first heating elements; and a first base secured between the first mounting plate and the first forming plate, wherein first base is formed of a temperature-resistant plastic, wherein the first base includes a first retaining channel that directly receives and retains the first forming plate, and wherein a three-dimensional (3D) printer is used to form the first base; and a second die including:

a second mounting plate formed of the one or more metals;

a second forming plate formed of the one or more metals, wherein the second forming plate includes one or more second heating elements; and a second base secured between the second mounting plate and the second forming plate, wherein second base is formed of the temperature-resistant plastic, wherein the second base includes a second retaining channel that directly receives and retains the second forming plate, and wherein the 3D printer is used to form the second base, wherein the first forming plate and the second forming plate are configured to form a panel through compression and heating.

20. The system of claim 19, further comprising one or more presses secured to the one or both of the first mounting plate or the second mounting plate, wherein one of the first base or the second base comprises guide pins, wherein the other of the first base or the second base comprises reciprocal channels, wherein the guide pins are configured to be received by the reciprocal channels as the first die moves relative toward the second die, and wherein the first base and the second base further comprise standoff pads disposed on exterior ledges outside of the first retaining channel and the second retaining channel, respectively.

* * * * *